United States Patent
Shi et al.

(10) Patent No.: US 12,426,117 B2
(45) Date of Patent: Sep. 23, 2025

(54) APPARATUS AND METHOD OF A MOBILE TERMINATING USER EQUIPMENT CONNECTING TO A FALLBACK NETWORK

(71) Applicant: INNOPEAK TECHNOLOGY, INC., Palo Alto, CA (US)

(72) Inventors: Yongsheng Shi, Palo Alto, CA (US); Xin Xu, Palo Alto, CA (US); Jaehyeuk Yang, Palo Alto, CA (US)

(73) Assignee: INNOPEAK TECHNOLOGY, INC., Palo Alto, CA (US)

(*) Notice: Subject to any disclaimer, the term of this patent is extended or adjusted under 35 U.S.C. 154(b) by 366 days.

(21) Appl. No.: 18/193,251

(22) Filed: Mar. 30, 2023

(65) Prior Publication Data
US 2023/0239952 A1    Jul. 27, 2023

Related U.S. Application Data

(63) Continuation of application No. PCT/US2021/041493, filed on Jul. 13, 2021.
(Continued)

(51) Int. Cl.
*H04L 12/00* (2006.01)
*H04L 65/1016* (2022.01)
(Continued)

(52) U.S. Cl.
CPC ......... *H04W 76/18* (2018.02); *H04L 65/1016* (2013.01); *H04L 65/1104* (2022.05); *H04W 36/00226* (2023.05)

(58) Field of Classification Search
CPC ........... H04W 76/18; H04W 36/00226; H04W 68/06; H04L 65/1016; H04L 65/1104; H04L 65/1095
(Continued)

(56) References Cited

U.S. PATENT DOCUMENTS 8,908,504 B2 * 12/2014 Barbieri ............... H04W 36/06
                                                        370/350
8,971,893 B2 *  3/2015 Li ....................... H04W 76/18
                                                        455/435.2
(Continued)

FOREIGN PATENT DOCUMENTS

CN    106792987    5/2017
CN    110418384    11/2019
(Continued)

OTHER PUBLICATIONS

WIPO, International Search Report and Written Opinion for PCT/US2021/041493, Oct. 6, 2021.
(Continued)

*Primary Examiner* — Frantz Coby
(74) *Attorney, Agent, or Firm* — Hodgson Russ LLP

(57) ABSTRACT

An apparatus for wireless communication of a user equipment (UE) is disclosed. The apparatus may include a memory and at least one processor coupled to the memory. The at least one processor may be configured to receive a paging signal associated with an mobile terminating (MT) internet protocol (IP) multimedia subsystem (IMS) voice session. The at least one processor may be further configured to send a session initiation protocol (SIP) message in response to the paging signal. The at least one processor may be further configured to receive a second SIP message indicating SIP failure. The at least one processor may be further configured to determine whether the second SIP message indicates a network failure or a global failure. The at least one processor may be further configured to establish a connection with a different RAT network when the second SIP message indicates a network failure or a global failure.

20 Claims, 9 Drawing Sheets

Related U.S. Application Data

(60) Provisional application No. 63/085,742, filed on Sep. 30, 2020.

(51) Int. Cl.
  *H04L 65/1104* (2022.01)
  *H04W 36/00* (2009.01)
  *H04W 76/18* (2018.01)

(58) Field of Classification Search
  USPC .................................................. 370/329, 331
  See application file for complete search history.

(56) References Cited

U.S. PATENT DOCUMENTS

| | | | | |
|---|---|---|---|---|
| 9,220,036 | B2* | 12/2015 | Ramachandran | ............................ H04W 36/00224 |
| 10,028,243 | B2* | 7/2018 | Liao | .................... H04L 65/1016 |
| 10,728,718 | B2* | 7/2020 | Meng | ................. H04W 88/023 |
| 10,757,612 | B2* | 8/2020 | Chiang | ................. H04W 48/18 |
| 10,893,444 | B2* | 1/2021 | Zhu | .................... H04W 36/1443 |
| 2011/0317659 | A1* | 12/2011 | Ramachandran | ............................ H04W 36/00224 370/331 |
| 2013/0003533 | A1* | 1/2013 | Barbieri | ................. H04W 36/06 370/225 |
| 2014/0148169 | A1* | 5/2014 | Li | ......................... H04W 36/08 455/437 |
| 2017/0150468 | A1* | 5/2017 | Liao | ................. H04W 36/00226 |
| 2019/0191349 | A1* | 6/2019 | Kim | ...................... H04W 76/18 |
| 2019/0281506 | A1* | 9/2019 | Chiang | ............... H04L 65/1069 |
| 2020/0245195 | A1* | 7/2020 | Zhu | ................. H04W 36/00226 |
| 2021/0051529 | A1* | 2/2021 | Yuan | ....................... H04W 4/16 |
| 2022/0086198 | A1* | 3/2022 | Cakulev | .............. H04L 65/1063 |
| 2023/0239952 | A1* | 7/2023 | Shi | ................. H04W 36/00226 370/329 |

FOREIGN PATENT DOCUMENTS

| | | | | |
|---|---|---|---|---|
| WO | WO-2019090626 A1 * | 5/2019 | ........... | H04L 1/0026 |
| WO | WO-2019090752 A1 * | 5/2019 | ............... | H04B 7/06 |

OTHER PUBLICATIONS

EPO, Extended European Search Report for EP Application No. 21876163.3, Aug. 23, 2023.

CNIPA, First Office Action for CN Application No. 202180066989.4, May 7, 2025.

* cited by examiner

APPARATUS AND METHOD OF A MOBILE TERMINATING USER EQUIPMENT CONNECTING TO A FALLBACK NETWORK

CROSS-REFERENCE TO RELATED APPLICATION(S)

This application is a continuation of International Application No. PCT/US2021/041493, filed Jul. 13, 2021, which claims priority to U.S. Provisional Application No. 63/085,742, filed Sep. 30, 2020, the entire disclosures of the above-mentioned applications are incorporated herein by reference.

BACKGROUND

Embodiments of the present disclosure relate to apparatus and method for wireless communication.

Wireless communication systems are widely deployed to provide various telecommunication services such as telephony, video, data, messaging, and broadcasts. In cellular communication, such as the 4th-generation (4G) Long Term Evolution (LTE) and the 5th-generation (5G) New Radio (NR), the 3rd Generation Partnership Project (3GPP) defines various mechanisms for establishing internet protocol (IP) multimedia subsystem (IMS) voice sessions in a standalone (SA) 5G network.

SUMMARY

Embodiments of apparatus and method for establishing a connection with a fallback network when a mobile terminating (MT) NR user equipment (UE) receives a network or global Session Initiation Protocol (SIP) failure message are disclosed herein.

According to one aspect of the present disclosure, an apparatus for wireless communication of a UE is disclosed. The apparatus may include a memory and at least one processor coupled to the memory. The at least one processor may be configured to receive, from an NR base station, a paging signal associated with an MT IMS voice session. The at least one processor may be further configured to send, to the NR base station, an SIP message in response to the paging signal. The at least one processor may be further configured to receive, from the NR base station, a second SIP message indicating SIP failure. The at least one processor may be further configured to determine that the second SIP message indicates a network failure or a global failure. The at least one processor may be further configured to establish a connection with a different RAT network in response to determining that the second SIP message indicates a network failure or a global failure.

According to another aspect of the present disclosure, a method of wireless communication of a UE is disclosed. The method may include receiving, from an NR base station, a paging signal associated with an MT IMS voice session. The method may also include sending, to the NR base station, a first SIP message in response to the paging signal. The method may also include receiving, from the NR base station, a second SIP message indicating SIP failure. The method may also include determining that the second SIP message indicates a network failure or a global failure. The method may also include establishing a connection with a different RAT network in response to determining that the second SIP message indicates a network failure or a global failure.

According to another aspect of the present disclosure, a non-transitory computer-readable medium encoding instructions that, when executed by at least one processor, perform a process for voice communication of a UE is disclosed. The process may include receiving, from an NR base station, a paging signal associated with an MT IMS voice session. The process may also include sending, to the NR base station, a SIP message in response to the paging signal. The process may also include receiving, from the NR base station, a SIP failure message in response to the SIP message. The process may also include establishing a connection with a different RAT network in response to determining that the SIP failure message is associated with a network failure or a global failure.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
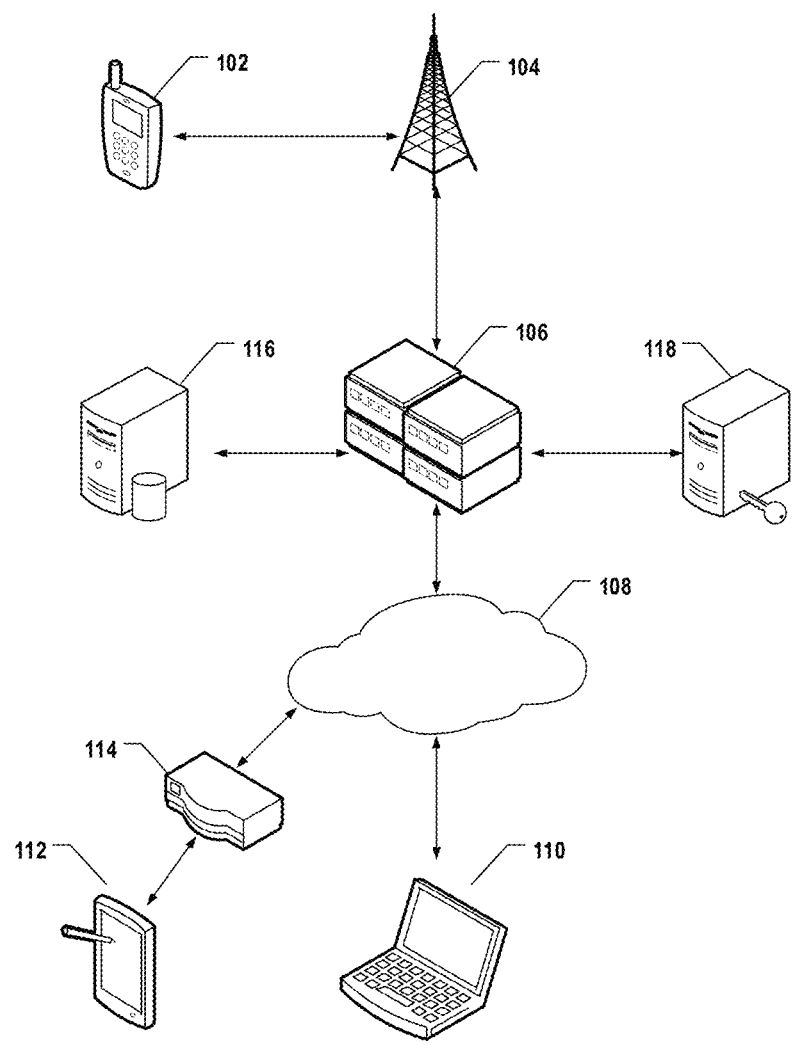
FIG. 1 illustrates an exemplary wireless network, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, wireless local area network (WLAN) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as the Global System for Mobile Communications (GSM). An OFDMA network may implement a RAT, such as LTE or NR. A WLAN system may implement a RAT, such as Wi-Fi. The techniques described herein may be used for the wireless networks and RATs mentioned above, as well as other wireless networks and RATs.

IMS is predominantly used for delivering voice and video-based multimedia services (referred to hereinafter as "voice session") over IP networks such as LTE, Wi-Fi, rich communication service (RCS), etc. to deliver services such as, e.g., voice over LTE (VoLTE), voice over Wi-Fi (Vo-WiFi), and the like. As IMS is access independent, it can also connect to the 5G network as well (via user plane function (UPF)) for delivering services, e.g., such as VoNR.

VoNR is a basic call service, which fully utilizes the SA architecture of the 5G network. Like VoLTE, VoNR establishes voice/video communication services (collectively referred to herein as a "voice session") with the IMS. Compared to other call services, VoNR provides significantly lower latency, improved sound and picture quality, which results in an extremely elevated calling experience. During the nascent stage of 5G network deployment, VoNR may not be available in all service areas, or in instances when a UE is near an NR cell edge, the VoNR quality may be quite low; moreover, certain legacy UEs operating within the 5G network may not have VoNR capabilities.

In instances such as when VoNR is not available, the industry has specified that the 4G voice/video communication architecture be used by NR UEs to establish voice/video communication services with the IMS. For example, when a gNB that does not support VoNR receives an IMS voice session request from an NR UE, the gNB establishes an IMS voice/video communication channel on the NR network, and the UE performs an EPS fallback procedure to the 4G network to establish the IMS voice session (as shown in the EPS fallback procedure data flow 600 of FIG. 6). The EPS fallback procedure of FIG. 6 may also be used for UEs near an NR cell-edge, for legacy UEs without VoNR capabilities, or when there is a lack of NR radio resources available for voice session establishment.

Figure 6:
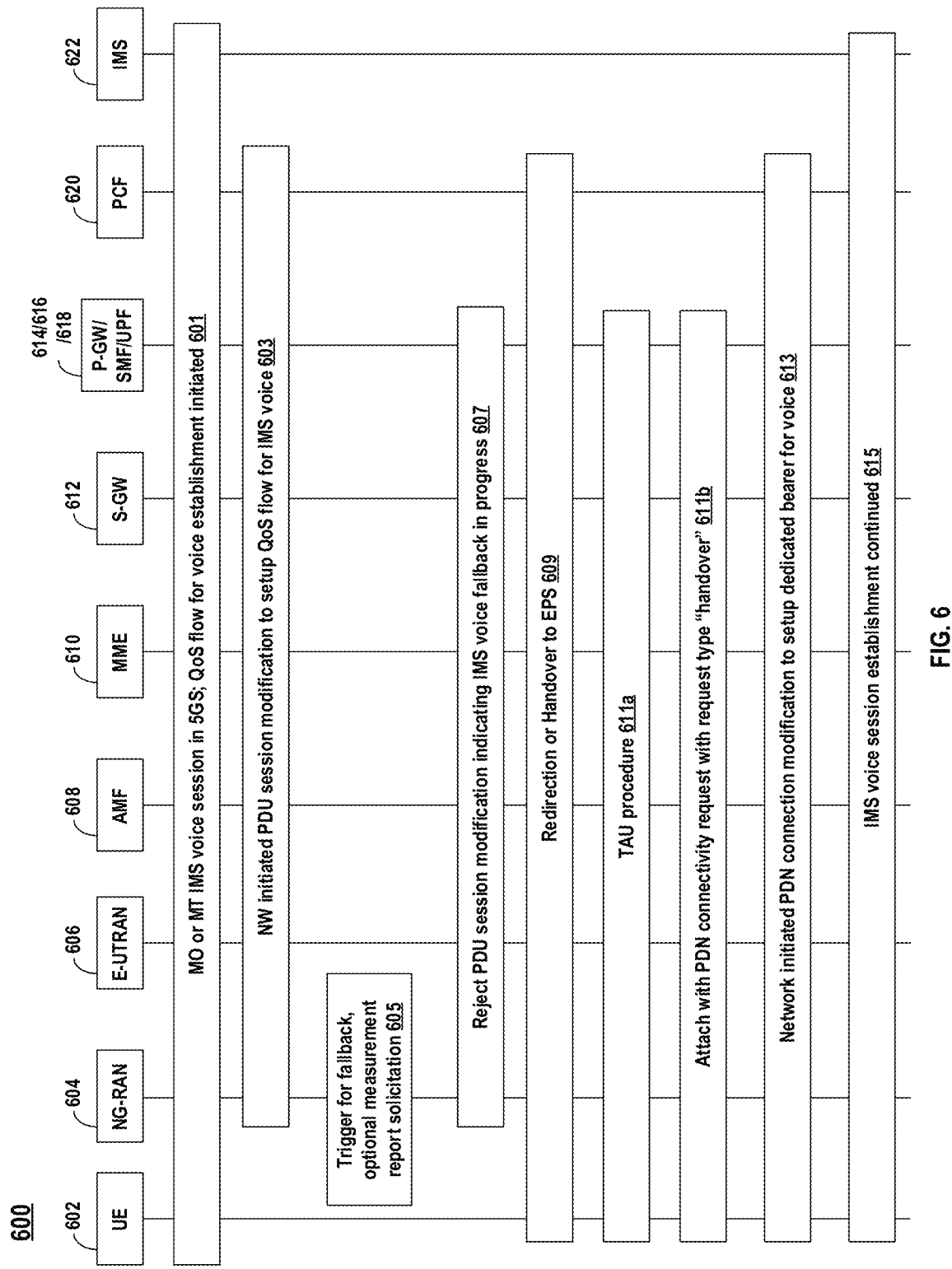
FIG. 6 illustrates a conceptual flow diagram of a data flow of an evolved packet system (EPS) fallback procedure.

FIG. 6 illustrates a data flow 600 of an EPS fallback procedure between core network elements of the 5G and 4G networks. In FIG. 6, the 4G core network elements include, e.g., evolved universal terrestrial access network (E-UTRAN) (the collective evolved node B (eNBs) of the 4G network), a mobility management entity (MME) 610, a serving gateway (S-GW) 612, or a packet data network gateway (P-GW) 614. The 5G core network elements include, e.g., next-generation radio access network (NG-RAN) 604 (the collective g node B (gNBs) of the 5G network), an access and mobility management function (AMF) 608, a session management function (SMF) 616, a user plane function (UPF) 618, and policy control function (PCF) 620. As mentioned above, IMS 622 is access independent, and its services may be accessed using the core network elements of either the 4G or 5G networks.

Referring to FIG. 6, at 601, UE 602 resides on NG-RAN 604 and initiates the establishment of the mobile originating (MO) and/or mobile terminating (MT) IMS voice session with its NR serving gNB. At 603, NG-RAN 604 receives the network-initiated packet data unit (PDU) session modification request to set up quality-of-service (QoS) flow for a voice session. At 605, NG-RAN 604 may trigger fallback to EPS when an indication to redirect EPS fallback for voice, network configuration, and/or radio conditions is received from AMF 608. However, when NG-RAN 604 determines (at 605) not to trigger the fallback to EPS, then the procedure stops, and the following steps are not performed. Also, at 605, NG-RAN 604 may initiate measurement report solicitation from UE 602 including E-UTRAN 606 as the handover/fallback target. At 607, NG-RAN 604 may reject the PDU Session modification request (received at 603) with an indication that mobility due to fallback for IMS voice is ongoing. Also, at 607, NG-RAN 604 may indicate the rejection of the PDU session modification to configure QoS flow for IMS voice (received at 603) as PDU session response message toward SMF 616 through AMF 608. This message may include the details on the ongoing mobility due to EPS fallback for IMS voice. SMF 616 may maintain the policy charging control (PCC) rules that are associated with the QoS flows. Based on the UE functionalities, at 609, NG-RAN 604 may initiate handover to EPS. Also, at 609, SMF 616 may report the change of the RAT type, if PCF 620 is so subscribed. A timer may be initiated to track the failure of the EPS fallback procedure. After the timer expires, at 609, SMF 616 may notify PCF 620 of the dedicated bearer creation failure, and new statistics (with the "smf_eps_fb" and "timeout" labels) may be incremented. At 611*a*, for 5G to EPS handover, UE 602 may initiate a tracking area update (TAU) procedure. At 611*b*, UE 602 may attach the packet data network (PDN) connectivity request with the "handover" request type. After the completion of the 5GS to EPS handover procedure, at 613, either SMF 616 or P-GW 614 may re-initiate the configuration of the dedicated bearer for IMS voice and map the 5G QoS to EPC QoS parameters. At

613, SMF 616 may notify PCF 620 of the successful resource allocation and access network information, if the PCF 620 is so subscribed. At 615, the IMS voice session establishment/initiation continues on the 4G network.

Both VoNR and VoLTE use a Session Initiation Protocol (SIP) for control plane signaling between the UE 602 and the IMS 622. SIP is used to establish and tear down multimedia sessions in the IMS. One of the many ways in which NR UEs and LTE UEs differ is that during call failure, an NR UE cannot perform circuit-switched (CS) fallback (FB) (CSFB) to complete the call using CS. This is because NR UEs are unable to perform CS plus packet switch (PS) domain registration on 5G NR.

For mobile originating (MO) call failure, the NR UE may receive an SIP failure message (5xx or 6xx, for instance) that indicates the reason for the failure. When the SIP failure message indicates a network failure (5xx) or a global failure (6xx), the NR UE may switch to a different RAT (e.g., LTE, Wi-Fi, 3G, 2G, etc.) to complete the call. This switch may happen in the background such that the user who originated the call is completely unaware of the SIP failure, and the call is established seamlessly using the different RAT. In instances where the call cannot be established using a different RAT, the user who originated the call will at least be aware of the call failure. However, this is not the case for mobile terminating (MT) call failure, which can lead to extended periods where a user may be unaware of the lack of voice services and miss incoming calls unknowingly.

When an NR UR receives an MT paging message (SIP Invite) for an MT voice call, the NR UE is still unaware of the number from which the call originated. To establish the MT voice session for the incoming call, the NR UE initially sends a first SIP message (1xx provisional message, for instance) to the gNB. In instances of network or global failure, however, the NR UE will receive (in response to its initial SIP message) an SIP failure message (5xx or 6xx), and the voice call is broken off before the MT user's phone even rings. Because the NR UE does not know the number from which the MT call originated, the number cannot be redialed, and the user may continue to miss voice calls for the duration of the SIP network or global failure. This may be particularly problematic during the nascent deployment of the 5G network and applies to scenarios in which the MT call is established using VoNR and/or EPS fallback.

Thus, there is an unmet need for a technique for establishing MT voice sessions in instances where the NR UE receives an SIP failure message associated with network failure (5xx) or global failure (6xx) so that a user does not experience a lapse in voice services for a prolonged period of time.

To overcome these and other challenges, the present disclosure enables a UE connected to the 5G network to switch to a fallback network when an SIP failure message is received in connection to an MT voice session. The UE may maintain a hierarchy of fallback networks to which it systematically attempts to establish a connection until the UE connects to one of the fallback networks. In so doing, the UE may receive voice calls using one of these networks so that an SIP network or global failure does not leave the user unknowingly without voice services for an extended period. By way of example, assume the hierarchy of fallback networks, from highest priority to lowest priority, includes: 1) LTE, 2) Wi-Fi, 3) 3G, and 4) 2G. Here, when the UE receives the SIP failure message in connection with an MT call, the UE may first attempt to establish a connection with the LTE network to receive further MT calls. If the LTE network is unavailable, the UE will next attempt to connect to a Wi-Fi network, and so on, until eventually a connection to one of the fallback networks is established. Moreover, with each SIP failure message that is received, the UE may increment a counter to keep track of the number of network and/or global SIP failures. The UE may bar NR communication for a predetermined period with each received SIP failure message. This may ensure that the user has access to voice services via a different RAT. For example, the UE may bar NR communications for 15 minutes upon the receipt of a first SIP failure message, 30 minutes upon the receipt of a second SIP failure message, 45 minutes upon the receipt of a third SIP failure message, and so on. In this way, continuity of voice service may be provided to the user while the network attempts to fix the issue associated with the SIP failure. Additional details of these and other techniques are provided below in connection with FIGS. 1-5.

FIG. 1 illustrates an exemplary wireless network 100, in which some aspects of the present disclosure may be implemented, according to some embodiments of the present disclosure. As shown in FIG. 1, wireless network 100 may include a network of nodes, such as a user equipment 102, an access node 104, and a core network element 106. User equipment 102 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 102 is illustrated as a mobile phone simply by way of illustration and not by way of limitation.

Access node 104 may be a device that communicates with user equipment 102, such as a wireless access point, a base station (BS), a Node B, an enhanced Node B (eNodeB or eNB), a next-generation NodeB (gNodeB or gNB), a cluster master node, or the like. Access node 104 may have a wired connection to user equipment 102, a wireless connection to user equipment 102, or any combination thereof. Access node 104 may be connected to user equipment 102 by multiple connections, and user equipment 102 may be connected to other access nodes in addition to access node 104. Access node 104 may also be connected to other user equipments. When configured as a gNB, access node 104 may operate in millimeter wave (mmW) frequencies and/or near mmW frequencies in communication with the user equipment 102. When access node 104 operates in mmW or near mmW frequencies, the access node 104 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW or near mmW radio frequency band have extremely high path loss and a short range. The mmW base station may utilize beamforming with user equipment 102 to compensate for the extremely high path loss and short range. It is understood that access node 104 is illustrated by a radio tower by way of illustration and not by way of limitation.

Access nodes 104, which are collectively referred to as E-UTRAN in the evolved packet core network (EPC) and as NG-RAN in the 5G core network (5GC), interface with the EPC and 5GC through dedicated backhaul links (e.g., S1 interface). In addition to other functions, access node 104 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. Access nodes 104 may communicate directly or indirectly (e.g., through the 5GC) with each other over backhaul links (e.g., X2 interface). The backhaul links may be wired or wireless.

Core network element 106 may serve access node 104 and user equipment 102 to provide core network services. Examples of core network element 106 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 106 includes an access and mobility management function (AMF), a session management function (SMF), or a user plane function (UPF), of a 5G core network (5GC) for the NR system. The AMF may be in communication with a Unified Data Management (UDM). The AMF is the control node that processes the signaling between the UEs 102 and the 5GC. Generally, the AMF provides QoS flow and session management. All user Internet protocol (IP) packets are transferred through the UPF. The UPF provides UE IP address allocation as well as other functions. The UPF is connected to the IP Services. The IP Services may include the Internet, an intranet, an IP Multimedia Subsystem (IMS), a PS Streaming Service, and/or other IP services. It is understood that core network element 106 is shown as a set of rack-mounted servers by way of illustration and not by way of limitation.

Core network element 106 may connect with a large network, such as the Internet 108, or another Internet Protocol (IP) network, to communicate packet data over any distance. In this way, data from user equipment 102 may be communicated to other user equipments connected to other access points, including, for example, a computer 110 connected to Internet 108, for example, using a wired connection or a wireless connection, or to a tablet 112 wirelessly connected to Internet 108 via a router 114. Thus, computer 110 and tablet 112 provide additional examples of possible user equipments, and router 114 provides an example of another possible access node.

A generic example of a rack-mounted server is provided as an illustration of core network element 106. However, there may be multiple elements in the core network including database servers, such as a database 116, and security and authentication servers, such as an authentication server 118. Database 116 may, for example, manage data related to user subscription to network services. A home location register (HLR) is an example of a standardized database of subscriber information for a cellular network. Likewise, authentication server 118 may handle authentication of users, sessions, and so on. In the NR system, an authentication server function (AUSF) device may be the entity to perform user equipment authentication. In some embodiments, a single server rack may handle multiple such functions, such that the connections between core network element 106, authentication server 118, and database 116, may be local connections within a single rack.

In order to allow inter-RAT (IRAT) handover between the EPC and 5GC, 4G/5G interworking may be supported by a common subscription data access function (HSS/UDM), combined functions such as PGW-C/SMF, PDN Gateway User Plane (PGW-U)/UPF, and the N26 interface between the MME and the AMF. This enables service continuity and mobility outside of 5G coverage areas, and also enables a smooth migration to a fully realized 5G network during the nascent stages of its deployment. In certain implementations, access node 104 and core network elements 106 within the 5G network may access the 5GC using control signaling independent of the EPC (and vice versa) and achieve interoperability between 4G and 5G networks through their core networks. 4G/5G interworking mainly includes cell (re)selection in RRC IDLE state, redirection, and handover in RRC_CONNECTED state. User equipment 102 may camp on the 5G cell and initiate services (such as IMS voice sessions) from the NR serving cell that may be fulfilled by either the 5G system (5GS), or, in instances when those services are not available at the 5G network (IMS voice, for example), the EPS. Thus, EPS fallback is required to guarantee voice service (by moving user equipment 102 from 5GS to EPS) before IMS-based voice services are connected to 5GC (namely, before VoNR is available on all NR cells) or for one of the various other reasons mentioned above.

Figure 5:
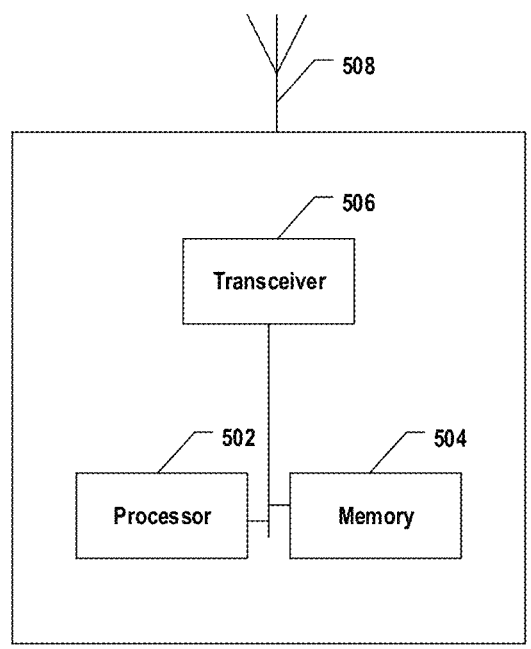
FIG. 5 illustrates a block diagram of an exemplary node, according to some embodiments of the present disclosure.

Each element in FIG. 1 may be considered a node of wireless network 100. More detail regarding the possible implementation of a node is provided by way of example in the description of a node 500 in FIG. 5. Node 500 may be configured as user equipment 102, access node 104, or core network element 106 in FIG. 1. Similarly, node 500 may also be configured as computer 110, router 114, tablet 112, database 116, or authentication server 118 in FIG. 1. As shown in FIG. 5, node 500 may include a processor 502, a memory 504, and a transceiver 506. These components are shown as connected to one another by a bus, but other connection types are also permitted. When node 500 is user equipment 102, additional components may also be included, such as a user interface (UI), sensors, and the like. Similarly, node 500 may be implemented as a blade in a server system when node 500 is configured as core network element 106. Other implementations are also possible.

Transceiver 506 may include any suitable device for sending and/or receiving data. Node 500 may include one or more transceivers, although only one transceiver 506 is shown for simplicity of illustration. An antenna 508 is shown as a possible communication mechanism for node 500. Multiple antennas and/or arrays of antennas may be utilized for receiving multiple spatially multiplex data streams. Additionally, examples of node 500 may communicate using wired techniques rather than (or in addition to) wireless techniques. For example, access node 104 may communicate wirelessly to user equipment 102 and may communicate by a wired connection (for example, by optical or coaxial cable) to core network element 106. Other communication hardware, such as a network interface card (NIC), may be included as well.

As shown in FIG. 5, node 500 may include processor 502. Although only one processor is shown, it is understood that multiple processors can be included. Processor 502 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 502 may be a hardware device having one or more processing cores. Processor 502 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 5, node 500 may also include memory 504. Although only one memory is shown, it is understood that multiple memories can be included. Memory 504 can broadly include both memory and storage. For example, memory 504 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 502. Broadly, memory 504 may be embodied by any computer-readable medium, such as a non-transitory computer-readable medium.

Processor 502, memory 504, and transceiver 506 may be implemented in various forms in node 500 for performing wireless communication functions. In some embodiments, processor 502, memory 504, and transceiver 506 of node 500 are implemented (e.g., integrated) on one or more system-on-chips (SoCs). In one example, processor 502 and memory 504 may be integrated on an application processor (AP) SoC (sometimes known as a "host," referred to herein as a "host chip") that handles application processing in an operating system (OS) environment, including generating raw data to be transmitted. In another example, processor 502 and memory 504 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 502 and transceiver 506 (and memory 504 in some cases) may be integrated on an RF SoC (sometimes known as a "transceiver," referred to herein as an "RF chip") that transmits and receives RF signals with antenna 508. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 1, in some embodiments, user equipment 102, which is initially connected to the 5G network, may be configured to switch to a fallback network when an SIP failure message is received in connection to an MT voice session. User equipment 102 may maintain a hierarchy of fallback networks to which it systematically attempts to connect until a connection with one of the fallback networks is eventually established. In so doing, user equipment 102 may receive voice calls using one a fallback network so that a network or global SIP failure does not leave the user without voice services for an extended period. By way of example, assume the hierarchy of fallback networks, from highest priority to lowest priority, includes: 1) LTE, 2) Wi-Fi, 3) 3G, and 4) 2G. Here, when user equipment 102 receives the SIP failure message in connection with an MT call, user equipment 102 may first attempt to establish a connection with the LTE network to provide the user with voice services. If the LTE network is unavailable, user equipment 102 may then attempt to connect to a Wi-Fi network, and so on, until eventually a connection to one of the fallback networks is established. Moreover, user equipment 102 may increment a counter to keep track of the number of network and/or global SIP failure messages received. User equipment 102 may bar NR communication for telescoping lengths of time with each new SIP failure message that is received. For example, user equipment 102 may bar NR communications for 15 minutes upon the receipt of a first SIP failure message, 30 minutes upon the receipt of a second SIP failure message, 45 minutes upon the receipt of a third SIP failure message, and so on. In this way, continuity of voice services may be provided to the user while the network attempts to fix the issue associated with the SIP failure.

Figure 2:
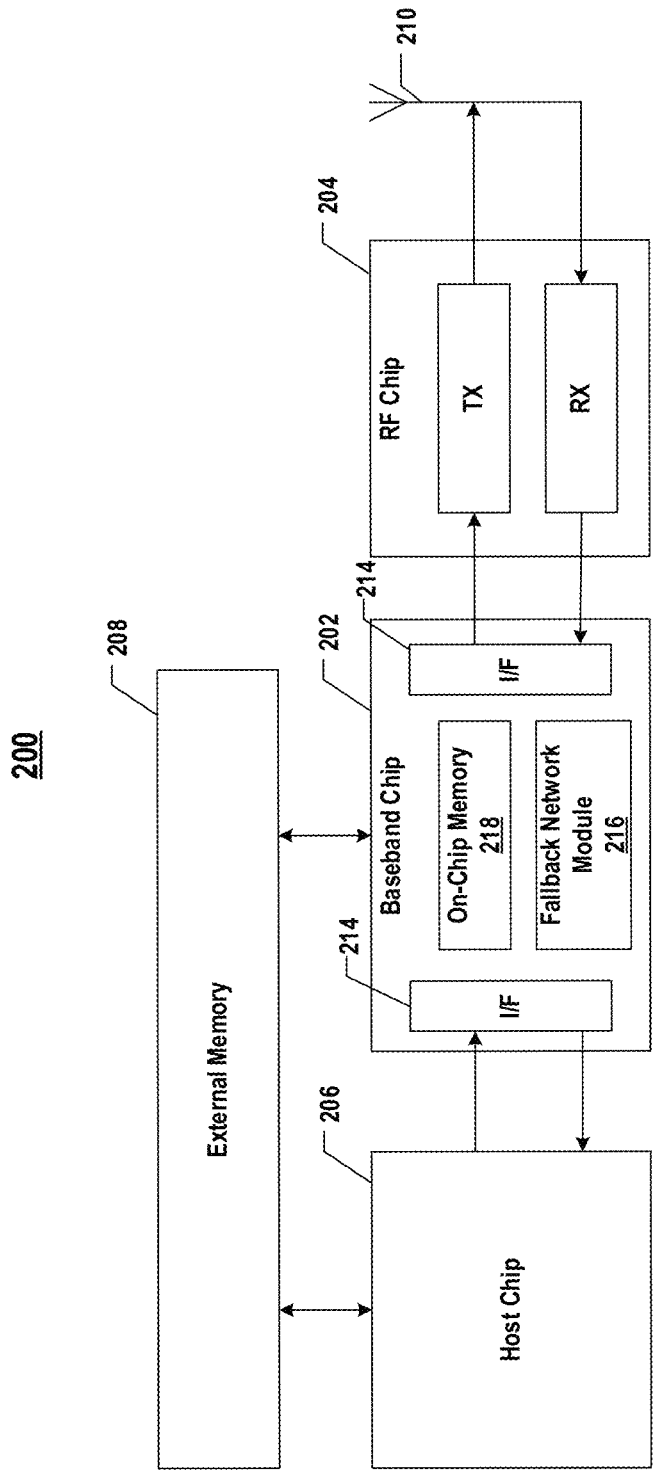
FIG. 2 illustrates a block diagram of an exemplary apparatus including a baseband chip, a radio frequency (RF) chip, and a host chip, according to some embodiments of the present disclosure.

FIG. 2 illustrates a block diagram of an apparatus 200 including a baseband chip 202, an RF chip 204, and a host chip 206, according to some embodiments of the present disclosure. Apparatus 200 may be implemented as user equipment 102 of wireless network 100 in FIG. 1. As shown in FIG. 2, apparatus 200 may include baseband chip 202, RF chip 204, host chip 206, and one or more antennas 210. In some embodiments, baseband chip 202 is implemented by processor 502 and memory 504, and RF chip 204 is implemented by processor 502, memory 504, and transceiver 506, as described above with respect to FIG. 5. Besides the on-chip memory 218 (also known as "internal memory," e.g., registers, buffers, or caches) on each chip 202, 204, or 206, apparatus 200 may further include an external memory 208 (e.g., the system memory or main memory) that can be shared by each chip 202, 204, or 206 through the system/main bus. Although baseband chip 202 is illustrated as a standalone SoC in FIG. 2, it is understood that in one example, baseband chip 202 and RF chip 204 may be integrated as one SoC; in another example, baseband chip 202 and host chip 206 may be integrated as one SoC; in still another example, baseband chip 202, RF chip 204, and host chip 206 may be integrated as one SoC, as described above.

In the uplink, host chip 206 may generate raw data and send it to baseband chip 202 for encoding, modulation, and mapping. Interface 214 of baseband chip 202 may receive the data from host chip 206. Baseband chip 202 may also access the raw data generated by host chip 206 and stored in external memory 208, for example, using the direct memory access (DMA). Baseband chip 202 may first encode (e.g., by source coding and/or channel coding) the raw data and modulate the coded data using any suitable modulation techniques, such as multi-phase shift keying (MPSK) modulation or quadrature amplitude modulation (QAM). Baseband chip 202 may perform any other functions, such as symbol or layer mapping, to convert the raw data into a signal that can be used to modulate the carrier frequency for transmission. In the uplink, baseband chip 202 may send the modulated signal to RF chip 204 via interface 214. RF chip 204, through the transmitter, may convert the modulated signal in the digital form into analog signals, i.e., RF signals, and perform any suitable front-end RF functions, such as filtering, digital pre-distortion, up-conversion, or sample-rate conversion. Antenna 210 (e.g., an antenna array) may transmit the RF signals provided by the transmitter of RF chip 204.

In the downlink, antenna 210 may receive RF signals from an access node or other wireless device. For example, the RF signals may include, among other things, information associated with an EPS fallback procedure to establish an IMS voice session, an inter-RAT MR request (event B1 or event B2 as specified by 3GPP), etc. The RF signals may be passed to the receiver (Rx) of RF chip 204. RF chip 204 may perform any suitable front-end RF functions, such as filtering, IQ imbalance compensation, down-paging conversion, or sample-rate conversion, and convert the RF signals (e.g., transmission) into low-frequency digital signals (baseband signals) that can be processed by baseband chip 202.

As seen in FIG. 2, baseband chip 202 may include fallback network module 216 configured to maintain a hierarchy of fallback networks to which apparatus 200 systematically attempts to connect until a connection is eventually established. In so doing, apparatus 200 may provide voice services via one of these networks so that a network or global failure does not leave a user unknowingly without voice service for an extended period. By way of example, assume the hierarchy of fallback networks, from highest priority to lowest priority, includes: 1) LTE, 2) Wi-Fi, 3) 3G, and 4) 2G. Here, when apparatus 200 receives the SIP failure message (in an RF signal) in connection with an MT call, fallback network module 216 may first attempt to establish a connection with the LTE network to provide voice services. If the LTE network is unavailable, fallback network module 216 will next attempt to connect to a Wi-Fi network, and so on. In some embodiments, the first fallback network is an LTE network, the second fallback network is a Wi-Fi network, and the third fallback network is a 3G network or a 2G network. Additional details of these and other techniques are provided below in connection with FIGS. 3A-3C, 4A, and 4B.

Figure 3A:
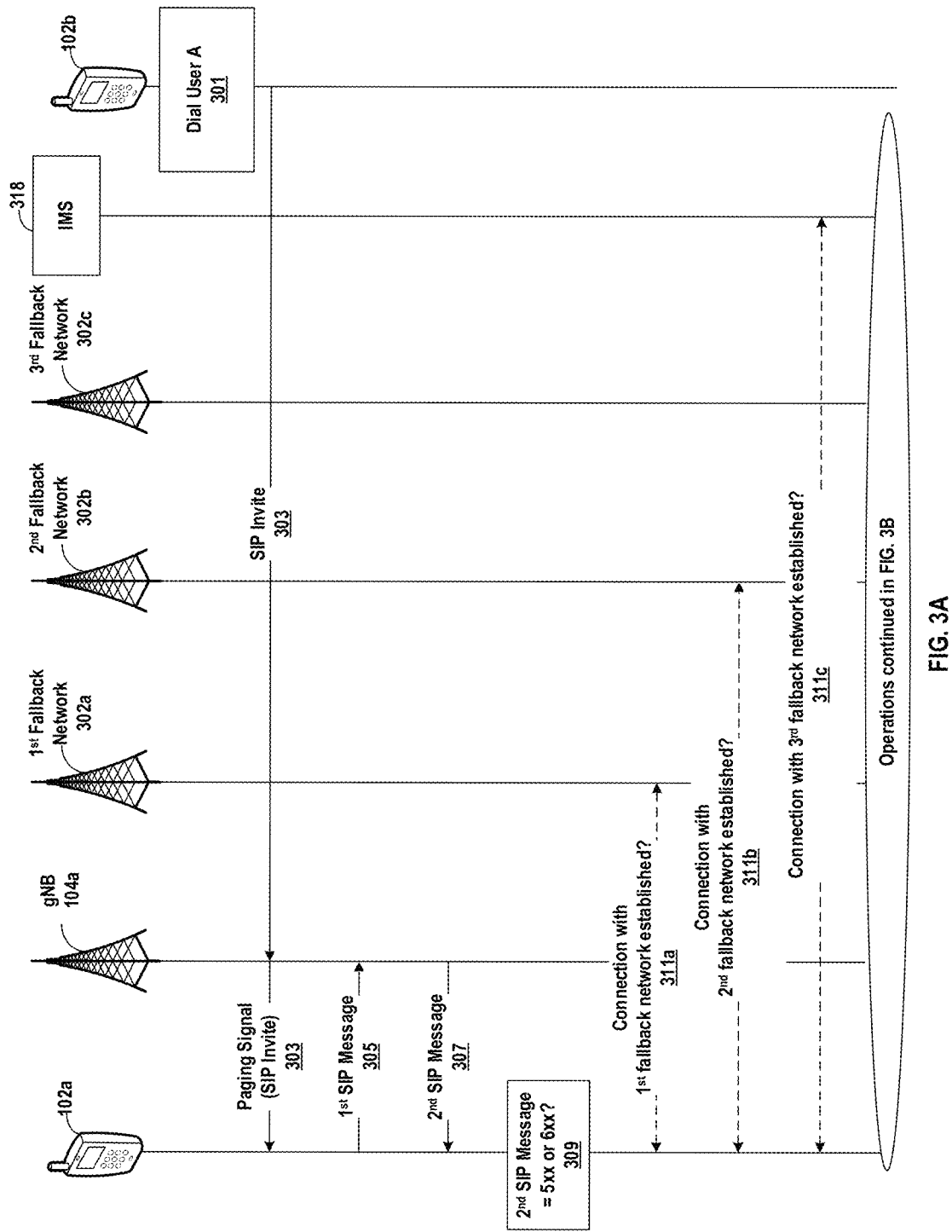
FIGS. 3A-3C illustrate a conceptual flow diagram of the exemplary data flow between a user equipment (UE) and various other wireless communication devices, according to some embodiments of the present disclosure.
Figure 3B:
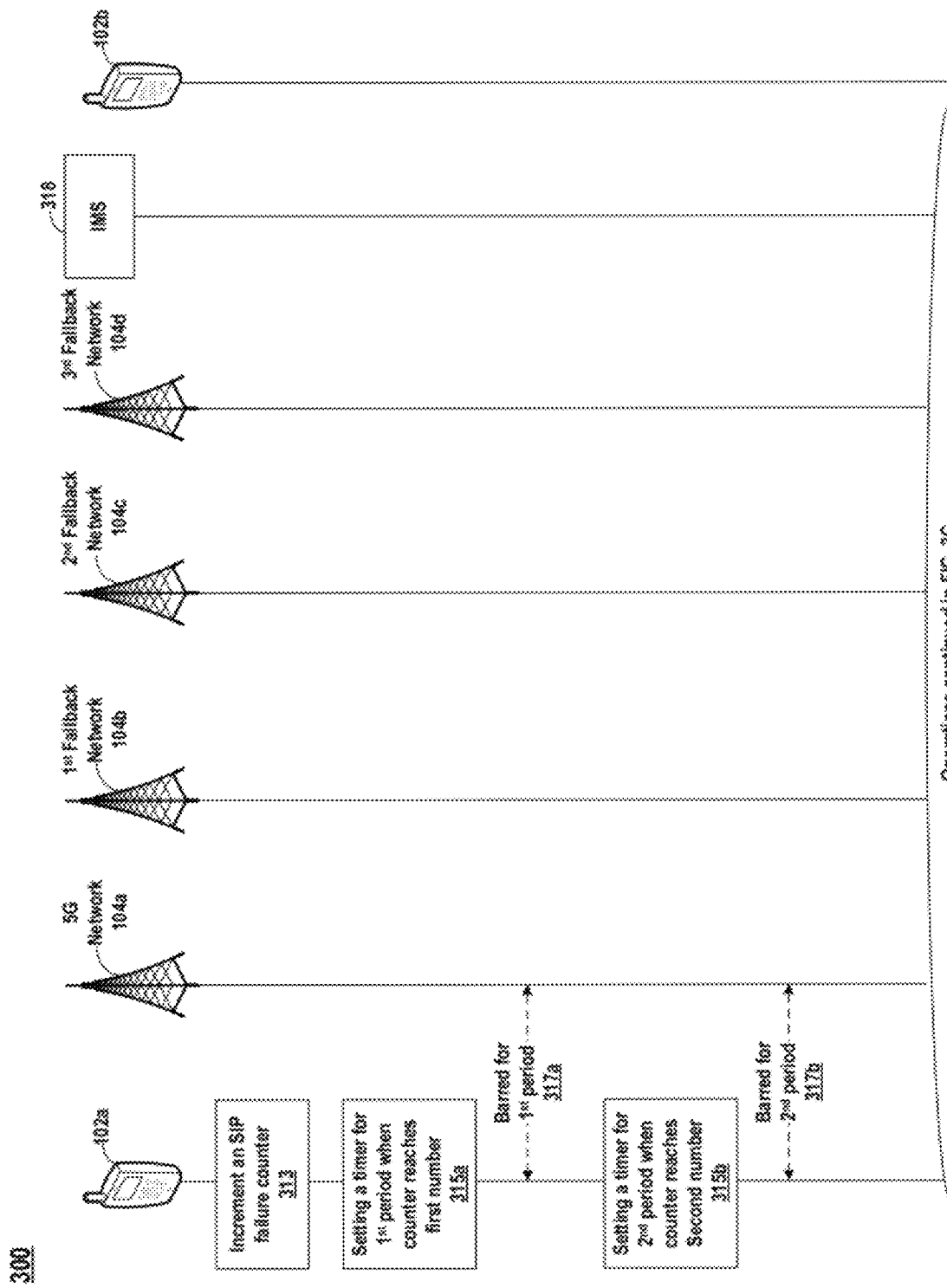
Figure 3C:
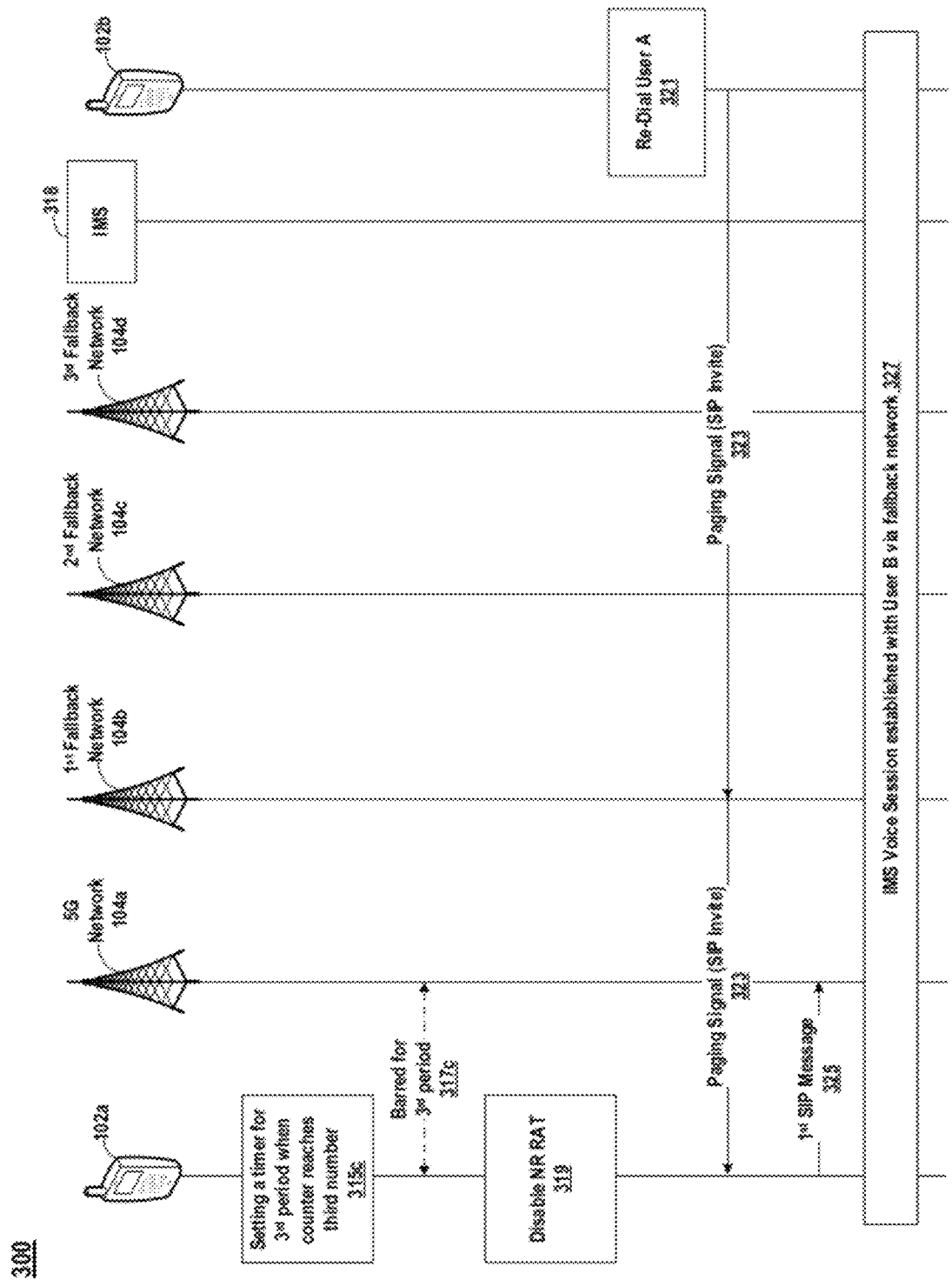

FIGS. 3A-3C illustrate a data flow 300 between an MT UE 102a, an MO UE 102b, gNB 104a, an access node of a first fallback network 104b (hereinafter "AN1 104b"), an access node of a second fallback network 104c (hereinafter "AN2 104c"), an access node of a third fallback network 104d (hereinafter "AN3 104d"), and IMS 318, according to certain aspects of the present disclosure. MT UE 102a may correspond to, e.g., apparatus 200 and/or node 500. MO UE 102b may correspond to, e.g., apparatus 200 and/or node 500. gNB 104a may correspond to, e.g., access node 104 or node 500. AN1 104b may correspond to, e.g., access node 104 and/or node 500. AN2 104c may correspond to, e.g., access node 104 and/or node 500. AN3 104d may correspond to, e.g., access node 104 and/or node 500. IMS 318 may correspond to, e.g., IMS 622. The first fallback network, the second network, and the third network may each include a different wireless communication network (cellular or otherwise). The hierarchy of fallback networks in order of priority, from highest to lowest, may include: 1) first fallback network, 2) second fallback network, and 3) third fallback network. Non-limiting examples of fallback networks may be included (in an order in the hierarchy may include, e.g., LTE, Wi-Fi, 3G, 2G, a wireless personal area network (WPAN), a WLAN, and/or a wireless mesh network, just to name a few. Although three fallback networks are provided in the following example, MT UE 102a may attempt to establish a connection with more or fewer than three fallback networks in order to provide continuity of voice services to the user during network and/or global SIP failure. In FIGS. 3A-3C, optional operations may be indicated with dashed lines.

Referring to FIG. 3A, to establish an IMS voice session with MT UE 102a, user B of MO UE 102b first dials (at 301) the cellphone number for user A of MT UE 102a. To begin the process of establishing the IMS voice session, an SIP Invite signal is sent (at 303) from MO UE 102b through IMS 318 to MT UE 102a. Although not shown, the SIP Invite signal may be sent through servers, proxies, entities, etc., of IMS 318, which eventually forwards the SIP Invite signal to gNB 104a. Once received by gNB 104a, the SIP Invite signal (a paging signal) may be sent to MT UE 102a.

Before MT UE 102a begins to ring, an SIP response signal (lxx provisional response message, for instance) may be sent (at 305) to gNB 104a, which, unless there is a network failure, global failure, or other types of system failure, will forward the SIP response signal to IMS 318 to initiate an IMS voice session with VoNR or EPS fallback. However, when there is a network or global SIP failure, gNB 104a may return (at 307) an SIP failure message indicating a 5xx failure (network) or 6xx failure (global) to MT UE 102a.

MT UE 102a may determine (at 309) whether the SIP failure message is a 5xx failure message or a 6xx failure message. When it is determined that the SIP failure message indicates either a 5xx or 6xx failure, MT UE 102a may determine (at 311a) whether a connection can be established with the first fallback network by trying to connect via AN1 104b, for example. When possible, MT UE 102a may connect to the first fallback network to provide voice service continuity to MT UE 102a. In instances when the first fallback network is unavailable, MT UE 102a may determine (at 311b) whether a connection with the second fallback network may be established (via AN2 104c, for example), and establish a connection with the second fallback network when possible. In instances when the second fallback network is also unavailable, MT UE 102a may determine (at 311c) whether the third fallback network is available. Here again, MT UE 102a may connect to the third fallback network when possible. When neither of the first, second, or third fallback networks, MT UE 102a may return to gNB 104a so that the user has access to IP services other than voice sessions.

Referring to FIG. 3B, each time an SIP failure message (5xx or 6xx, for instance) is received, MT UE 102a may increment (at 313) a counter. With each increment to the counter, MT UE 102a may bar NR communication for a certain amount of time. In some embodiments, MT UE 102a may bar NR communication for the same amount of time with each increment to the counter. In some other embodiments, MT UE 102a may bar NR communication for a telescoping time period with each increment to the counter. For example, the telescoping time period that includes x minutes (first period) for the first increment of the counter, 2x minutes (second period) for the second increment of the counter, 4x minutes (third period) for the third increment of the counter, and so on. Non-limiting examples of the value x can take include, e.g., 1, 5, 10, 15, 20, 30, 60, 720, etc. In other words, when the counter reaches a first number (e.g., 1), MT UE 102a may set (at 315a) a timer that bars (at 317a) NR communication for a first period (e.g., x minutes). Then, when a subsequent SIP failure message is received, and the counter reaches a second number (e.g., 2), the timer may be set (at 315b) to bar (at 317b) NR communication at MT UE 102a for a second period (e.g., 2x minutes). As shown in FIG. 3C, upon receiving a third SIP failure message, the timer may be set (at 315c) to bar (at 317c) NR communications for a third period (e.g., 4x minutes), and so on. Such a timer may be referred to as a "telescoping timer" since it increases the length of time barring NR communication with each new SIP failure message.

Barring NR communication may include, for example, barring NR communication with gNB 104a, barring NR communication with a tracking area associated with gNB 104a, or disabling (at 319) the NR RAT at MT UE 102a such that no NR communication can be performed with any NR cell for the duration of the timer. In this way, voice service continuity may be provided to the user of MT UE 102a when in a service area experiencing network or global SIP failure or where VoNR/EPS fallback is not available.

As an example, referring to FIG. 3C, assume that MT UE 102a connects (at 311a) to the first fallback network (via AN1 104b). Here, even though the user of MT UE 102a is unaware of the missed call, user B of MO UE 102b may be aware that the call to user A did not go through. So, user B of MO UE 102b may redial (at 321) user A. Once dialed, another SIP Invite message may be sent (at 323) to MT UE 102a via IMS 318 and AN1 104b of the first fallback network. Assuming no network or global SIP failure at the first fallback network, when MT UE 102a returns (at 325) another first SIP message (lxx provisional message, for instance) to AN1 104b, an IMS voice session may be established (at 327) using the first fallback network. In this way, voice service continuity may be provided to user A of MT UE 102a while the 5G network attempts to fix the issue associated with the SIP failure or until VoNR is available at gNB 104a.

Figure 4A:
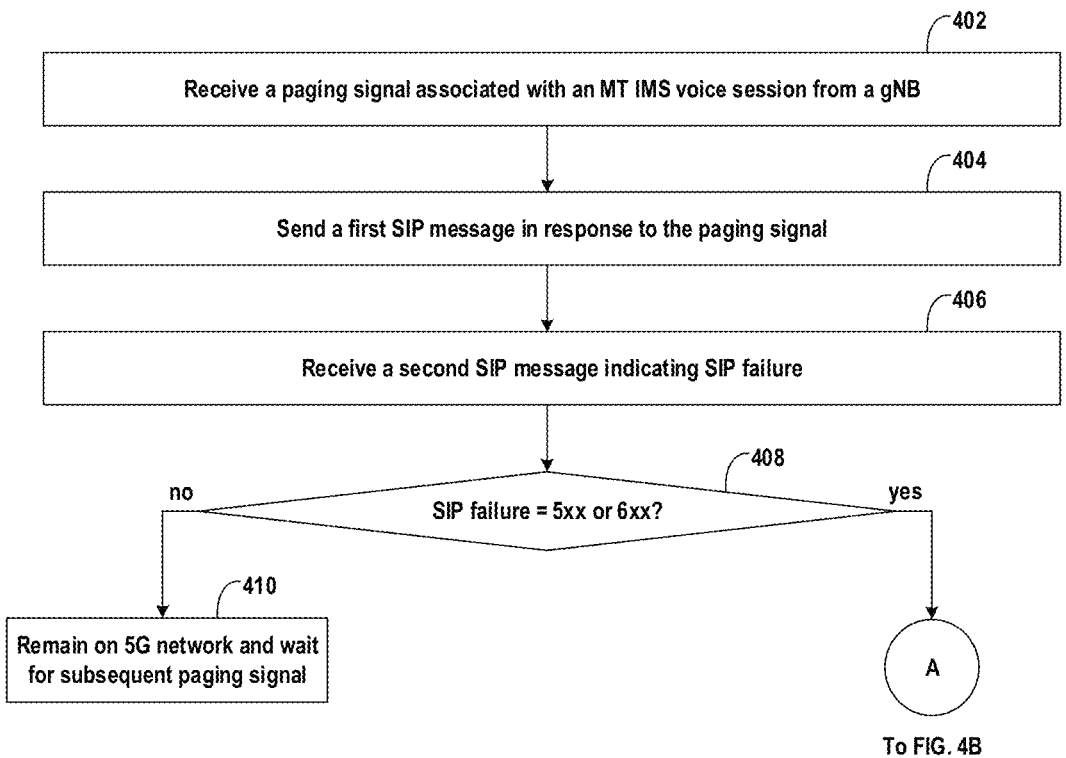
FIGS. 4A and 4B illustrate a flow chart of an exemplary method of wireless communication, according to some embodiments of the present disclosure.
Figure 4B:
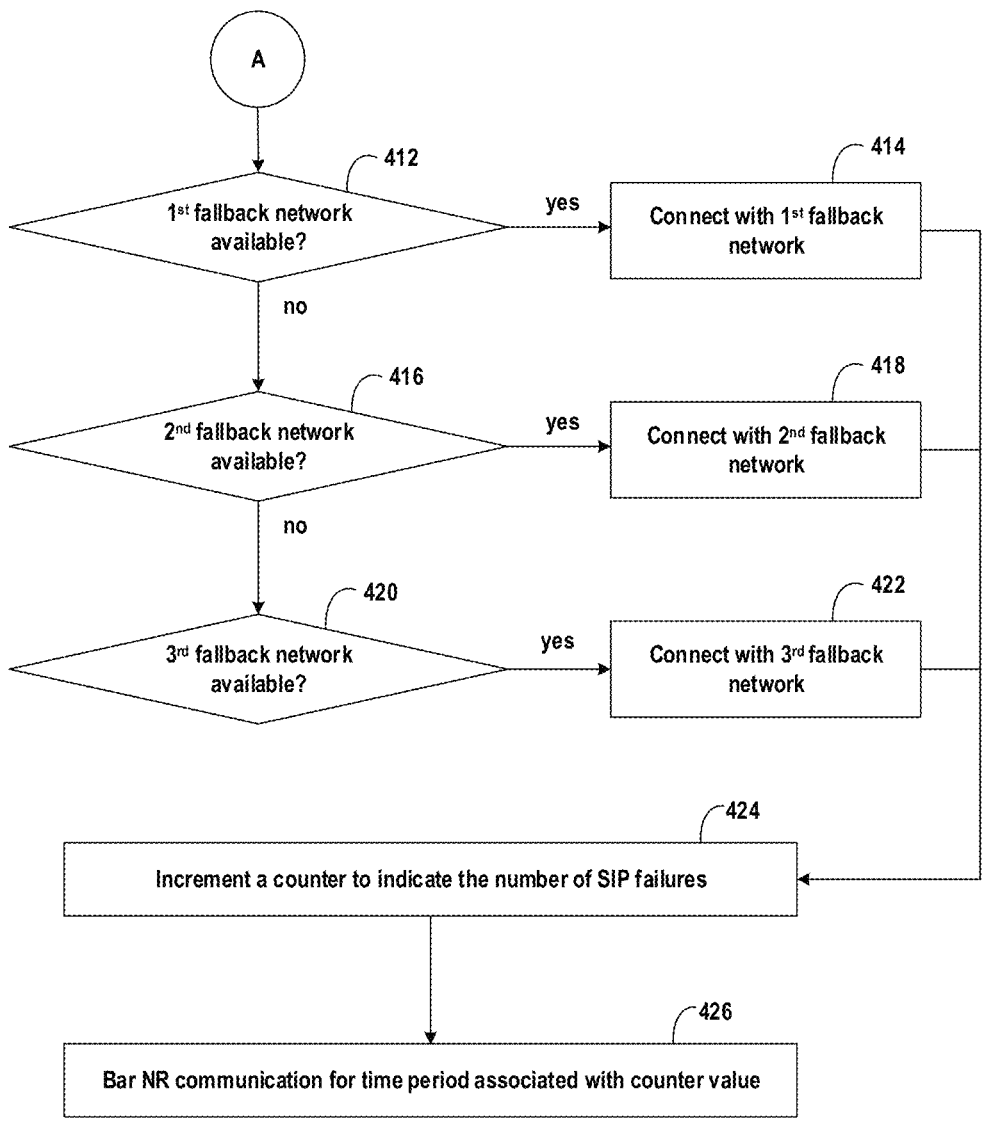

FIGS. 4A and 4B illustrate a flowchart of an exemplary method 400 of wireless communication, according to embodiments of the disclosure. Exemplary method 400 may be performed by an apparatus for wireless communication, e.g., such as user equipment 102, apparatus 200, baseband chip 202, MT UE 102a, and/or node 500. Method 400 may include steps 402-426 as described below. It is to be appreciated that some of the steps may be optional, and some of the steps may be performed simultaneously, or in a different order than shown in FIGS. 4A and 4B.

Referring to FIG. 4A, at 402, the apparatus may receive a paging signal associated with an MT IMS voice session. For example, referring to FIG. 3A, to begin the process of establishing the IMS voice session, an SIP Invite signal is sent (at 303) from MO UE 102b through IMS 318, which is received by MT UE 102a from gNB 104a.

At 404, the apparatus may send a first SIP message in response to the paging signal to an NR base station. For example, referring to FIG. 3A, an SIP response signal (lxx provisional response message, for instance) may be sent (at 305) to gNB 104a, which, unless there is a network failure, global failure, or other types of system failure, will forward the SIP response signal to IMS 318 to initiate an IMS voice session with VoNR or EPS fallback.

At 406, the apparatus may receive a second SIP message indicating SIP failure from the NR base station. For example, referring to FIG. 3A, when there is a network or global SIP failure, gNB 104a may return (at 307) an SIP failure message indicating a 5xx failure (network) or 6xx failure (global) to MT UE 102a.

At 408, the apparatus may determine whether the second SIP message indicates a network failure or a global failure. For example, referring to FIG. 3A, MR UE 102 may determine whether the SIP failure message received (at 307) is a 5xx failure or 6xx failure. 5xx failure responses are returned to MT UE 102a when the SIP server has erred (a.k.a., a network failure). On the other hand, 6xx failure responses are sent when the SIP server has definitive information about a user, not just the instance indicated in the Request-uniform resource identifier (URI).

Non-limiting examples of the type of 5xx failure response that may be received by the apparatus (at 408) include, e.g., 500 response (server internal error), 501 response (not implemented), 502 response (bad gateway), 503 response (service unavailable), 504 response (server timeout), 505 response (version too large), or 513 response (message too large). More specifically, a 500 response may indicate to MT UE 102a, e.g., that the SIP server encountered an unexpected condition that prevented it from fulfilling the request. MT UE 102a may display the error condition and may retry the request after several seconds. If the condition is temporary, the server may indicate when MT UE 102a may retry the request using the Retry-After header field. A 501 response may indicate to MT UE 102a, e.g., that the SIP server does not support the functionality required to fulfill the request. This is the appropriate response when a user agent server (UAS) does not recognize the request method and is not capable of supporting it for any user. A 502 response may indicate to MT UE 102a, e.g., the SIP server, while acting as a gateway or proxy, received an invalid response from the downstream server it accessed in attempting to fulfill the request. A 503 response may indicate to MT UE 102a, e.g., the SIP server is temporarily unable to process the request due to a temporary overloading or maintenance of the server. The server may indicate when MT UE 102a should retry the request in a Retry-After header field. If no Retry-After is given, MT UE 102a may act as if it had received a 500 (Server Internal Error) response. In some cases, an SIP server may refuse the connection or drop the request instead of responding with 503 (Service Unavailable). A 504 response may indicate to MT UE 102a, e.g., the SIP server did not receive a timely response from an external server it accessed in attempting to process the request. A 505 response may indicate to MT UE 102a, e.g., that the SIP server does not support, or refuses to support, the SIP protocol version that was used in the request. The server is indicating that it is unable or unwilling to complete the request using the same major version as the client, other than with this error message. A 513 response may indicate to MT UE 102a, e.g., that the SIP server was unable to process the request since the message length exceeded its capabilities.

Non-limiting examples of the type of 6xx failure response that may be received by the apparatus (at 408) include, e.g., a 604 response (Does Not Exist Anywhere) or 606 (Not Acceptable), just to name a few. More specifically, a 604 response may indicate to MT UE 102a, e.g., that the SIP server has authoritative information that MT UE 102a indicated in the Request-URI does not exist anywhere. A 606 response may indicate to MT UE 102a, e.g., that the agent was contacted successfully, but some aspects of the session description such as the requested media, bandwidth, or addressing style were not acceptable. A 606 (Not Acceptable) response means that the user wishes to communicate, but cannot adequately support the session described. The 606 (Not Acceptable) response MAY contain a list of reasons in a Warning header field describing why the session described cannot be supported. This status response is returned only if the client knows that no other end point will answer the request.

When it is determined (at 408) that the second SIP message does not include a 5xx or 6xx failure response, the operations move to 410. At 410, the apparatus may remain on the 5G network. However, on the other hand, when it is determined (at 408) that the second SIP message does include a 5xx or 6xx failure response, the operations move to 412 in FIG. 3B.

Referring to FIG. 3B, at 412, the apparatus may determine whether a first connection with a first fallback network can be established. For example, referring to FIG. 3A, when it is determined that the SIP failure message indicates either a 5xx or 6xx failure, MT UE 102a may determine (at 311a) whether a connection can be established with the first fallback network by trying to connect via AN1 104b, for example.

When it is determined (at 412) that a connection with the first fallback network can be established, the apparatus may connect (at 414) with the first fallback network. For example, referring to FIG. 3A, when possible, MT UE 102a may connect to the first fallback network to provide voice service continuity to MT UE 102a.

However, when it is determined (at 412) that a connection with the first fallback network cannot be established, the operations may move to 416. At 416, the apparatus may determine whether a second connection with a second fallback network can be established. For example, referring to FIG. 3A, in instances when the first fallback network is unavailable, MT UE 102a may determine (at 311b) whether a connection with the second fallback network may be established (via AN2 104c, for example), and establish a connection with the second fallback network when possible.

When it is determined (at 416) that a connection with the second fallback network can be established, the apparatus may connect (at 418) with the second fallback network. For example, referring to FIG. 3A, when possible, MT UE 102a may connect with the second fallback network (via AN2 104c, for example).

However, when it is determined (at 416) that a connection with the first fallback network cannot be established, the operations may move to 420. At 420, the apparatus may determine whether a third connection with a third fallback network can be established when it is determined that the second connection with the second fallback network cannot be established. For example, referring to FIG. 3A, in instances when the second fallback network is also unavailable, MT UE 102a may determine (at 311c) whether the third fallback network is available.

When it is determined (at 420) that a connection with the third fallback network can be established, the apparatus may connect (at 422) with the third fallback network. For example, referring to FIG. 3A, MT UE 102a may connect to the third fallback network (via AN3 104d) when possible. When neither of the first, second, or third fallback networks, the apparatus may remain on the 5G network so that the user has access to IP services other than voice.

At 424, the apparatus may increment a counter associated with a number of SIP failures when the second SIP message is received. For example, referring to FIG. 3B, each time an SIP failure message (5xx or 6xx, for instance) is received, MT UE 102a may increment (at 313) a counter.

At 426, the apparatus may bar the UE from performing NR communication for a time period with a duration associated with the number of SIP failures indicated by the counter. For example, referring to FIGS. 3B and 3C, with each increment to the counter, MT UE 102a may bar NR communication for a certain amount of time. In some embodiments, MT UE 102a may bar NR communication for the same amount of time with each increment to the counter. In some other embodiments, MT UE 102a may bar NR communication for a telescoping time period with each increment to the counter. For example, the telescoping time period that includes x minutes (first period) for the first increment of the counter, 2x minutes (second period) for the second increment of the counter, 4x minutes (third period) for the third increment of the counter, and so on. Non-limiting examples of the value x can take include, e.g., 1, 5, 10, 15, 20, 30, 60, 720, etc. In other words, when the counter reaches a first number (e.g., 1), MT UE 102a may set (at 315a) a timer that bars (at 317a) NR communication for a first period (e.g., x minutes). Then, when a subsequent SIP failure message is received, and the counter reaches a second number (e.g., 2), the timer may be set (at 315b) to bar (at 317b) NR communication at MT UE 102a for a second period (e.g., 2x minutes). As shown in FIG. 3C, upon receiving a third SIP failure message, the timer may be set (at 315c) to bar (at 317c) NR communications for a third period (e.g., 4x minutes), and so on. Such a timer may be referred to as a "telescoping timer" since it increases the length of time barring NR communication with each new SIP failure message. Barring NR communication may include, for example, barring NR communication with gNB 104a, barring NR communication with a tracking area associated with gNB 104a, or disabling (at 319) the NR RAT at MT UE 102a such that no NR communication can be performed with any NR cell for the duration of the timer.

Using the techniques described above in connection with FIGS. 1-5, voice service continuity may be provided to the user of MT UE even when in a service area that experiences network or global SIP failure or where VoNR/EPS fallback is not available.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 500 in FIG. 5. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, an apparatus for wireless communication of a UE is disclosed. The apparatus may include a memory and at least one processor coupled to the memory. The at least one processor may be configured to receive, from an NR base station, a paging signal associated with an MT IMS voice session. The at least one processor may be further configured to send, to the NR base station, an SIP message in response to the paging signal. The at least one processor may be further configured to receive, from the NR base station, a second SIP message indicating SIP failure. The at least one processor may be further configured to determine that the second SIP message indicates a network failure or a global failure. The at least one processor may be further configured to establish a connection with a different RAT network in response to determining that the second SIP message indicates a network failure or a global failure.

In some embodiments, the at least one processor may be configured to establish a connection with the different RAT network by determining that a first connection with a first fallback network can be established. In some embodiments, the at least one processor may be configured to establish a connection with the different RAT network by establishing the first connection with the first fallback network in response to determining that the first connection can be established.

In some embodiments, the at least one processor may be configured to establish a connection with the different RAT network by, in response to determining that the first connection with the first fallback network cannot be established and that a second connection with a second fallback network can be established, establishing the second connection with the second fallback network.

In some embodiments, the at least one processor may be configured to establish a connection with the different RAT network by, in response to determining that the second connection with the second fallback network cannot be established and that a third connection with a third fallback network can be established, establishing the third connection with the third fallback network.

In some embodiments, the first fallback network, the second fallback network, and the third fallback network may include different RAT networks. In some embodiments, the first fallback network, the second fallback network, and the third fallback network may each include one of an LTE network, a Wi-Fi network, a 3G network, or a 2G network.

In some embodiments, the at least one processor may be configured to increment a counter associated with a number of SIP failures when the second SIP message is received. In some embodiments, the at least one processor may be configured to bar the UE from performing NR communication for a first period when the number of SIP failures reaches a first number. In some embodiments, the at least one processor may be configured to bar the UE from performing NR communication for a second period when the number of SIP failures reaches a second number. In some embodiments, the second number may be greater than the first number. In some other embodiments, the second period may be longer than the first period. In some embodiments, the at least one processor may be configured to bar the UE from performing NR communication for a third period when the number of SIP failures reaches a third number. In some embodiments, the third number may be greater than the second number. In some embodiments, the third period may be longer than the second period.

In some embodiments, a respective length of each of the first period, the second period, and the third period may be set by a telescoping timer.

In some embodiments, the at least one processor may be configured to bar the UE from NR communication by barring the UE from NR communication with the NR base station.

In some embodiments, the at least one processor may be configured to bar the UE from NR communication by barring the UE from NR communication with all NR cells in a tracking area associated with the NR base station.

In some embodiments, the at least one processor may be configured to bar the UE from NR communication by disabling an NR RAT at the UE.

According to another aspect of the present disclosure, a method of wireless communication of a UE is disclosed. The method may include receiving, from an NR base station, a paging signal associated with an MT IMS voice session. The method may also include sending, to the NR base station, a first SIP message in response to the paging signal. The method may also include receiving, from the NR base station, a second SIP message indicating SIP failure. The method may also include determining that the second SIP message indicates a network failure or a global failure. The method may also include establishing a connection with a different RAT network in response to determining that the second SIP message indicates a network failure or a global failure.

In some embodiments, the establishing the connection with the different RAT network may include determining that a first connection with a first fallback network can be established. In some embodiments, the establishing the connection with the different RAT network may include establishing the first connection with the first fallback network in response to determining that the first connection can be established.

In some embodiments, the establishing the connection with the different RAT network further may include, in response to determining that the first connection with the first fallback network cannot be established and that a second connection with a second fallback network can be established, establishing the second connection with the second fallback network.

In some embodiments, the establishing the connection with the different RAT network further may include, in response to determining that the second connection with the second fallback network cannot be established and that a third connection with a third fallback network can be established, establishing the third connection with the third fallback network.

In some embodiments, the first fallback network, the second fallback network, and the third fallback network may be different RAT networks. In some embodiments, the first fallback network, the second fallback network, and the third fallback network each include one of an LTE network, a Wi-Fi network, a 3G network, or a 2G network.

In some embodiments, the method may further include incrementing a counter associated with a number of SIP failures when the second SIP message is received. In some embodiments, the method may further include barring the UE from performing NR communication for a first period when the number of SIP failures reaches a first number. In some embodiments, the method may further include barring the UE from performing NR communication for a second period when the number of SIP failures reaches a second number. In some embodiments, the second number may be greater than the first number. In some embodiments, the second period may be longer than the first period. In some embodiments, the method may further include barring the UE from performing NR communication for a third period when the number of SIP failures reaches a third number. In some embodiments, the third number may be greater than the second number. In some embodiments, the third period may be longer than the second period.

In some embodiments, the respective length of each of the first period, the second period, and the third period may be set by a telescoping timer.

In some embodiments, the barring the UE from performing NR communication for any of the first period, the second period, or the third period may include barring the UE from performing NR communication with the NR base station.

In some embodiments, the barring the UE from performing NR communication for any of the first period, the second period, or the third period may include barring the UE from performing NR communication with all NR cells in a tracking area associated with the NR base station.

In some embodiments, the barring the UE from performing NR communication for any of the first period, the second period, or the third period may include disabling an NR RAT at the UE.

According to another aspect of the present disclosure, a non-transitory computer-readable medium encoding instructions that, when executed by at least one processor, perform a process for voice communication of a UE is disclosed. The process may include receiving, from an NR base station, a paging signal associated with an MT IMS voice session. The process may also include sending, to the NR base station, a first SIP message in response to the paging signal. The process may also include receiving, from the NR base station, a second SIP message indicating SIP failure. The process may also include determining that the second SIP message indicates a network failure or a global failure. The process may also include establishing a connection with a different RAT network in response to determining that the second SIP message indicates a network failure or a global failure. In some embodiments, the second SIP message is also referred to as a SIP failure message which is transmitted in response to the first SIP message, and the connection with a different RAT network is established in response to determining that the SIP failure message is associated with a network failure or a global failure.

In some embodiments, the establishing the connection with the different RAT network may include determining that a first connection with a first fallback network can be established. In some embodiments, the establishing the connection with the different RAT network may include establishing the first connection with the first fallback network in response to determining that the first connection can be established.

In some embodiments, the establishing the connection with the different RAT network further may include, in response to determining that the first connection with the first fallback network cannot be established and that a second connection with a second fallback network can be established, establishing the second connection with the second fallback network.

In some embodiments, the establishing the connection with the different RAT network further may include, in response to determining that the second connection with the second fallback network cannot be established and that a third connection with a third fallback network can be established, establishing the third connection with the third fallback network.

In some embodiments, the first fallback network, the second fallback network, and the third fallback network may be different RAT networks. In some embodiments, the first fallback network, the second fallback network, and the third fallback network each include one of an LTE network, a Wi-Fi network, a 3G network, or a 2G network.

In some embodiments, the process may further include incrementing a counter associated with a number of SIP failures when the second SIP message is received. In some embodiments, the process may further include barring the UE from performing NR communication for a first period when the number of SIP failures reaches a first number. In some embodiments, the process may further include barring the UE from performing NR communication for a second period when the number of SIP failures reaches a second number. In some embodiments, the second number may be greater than the first number. In some embodiments, the second period may be longer than the first period. In some embodiments, the process may further include barring the UE from performing NR communication for a third period when the number of SIP failures reaches a third number. In some embodiments, the third number may be greater than the second number. In some embodiments, the third period may be longer than the second period.

In some embodiments, the respective length of each of the first period, the second period, and the third period may be set by a telescoping timer.

In some embodiments, the barring the UE from performing NR communication for any of the first period, the second period, or the third period may include barring the UE from performing NR communication with the NR base station.

In some embodiments, the barring the UE from performing NR communication for any of the first period, the second period, or the third period may include barring the UE from performing NR communication with all NR cells in a tracking area associated with the NR base station.

In some embodiments, the barring the UE from performing NR communication for any of the first period, the second period, or the third period may include disabling an NR RAT at the UE.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus for wireless communication of a user equipment (UE), comprising:
   a memory; and
   at least one processor coupled to the memory and configured to:

receive, from a new radio (NR) base station, a paging signal associated with a mobile terminating (MT) internet protocol (IP) multimedia subsystem (IMS) voice session;

send, to the NR base station, a first session initiation protocol (SIP) message in response to the paging signal;

receive, from the NR base station, a second SIP message indicating a SIP failure;

determine that the second SIP message indicates a network failure or a global failure; and establish a connection with a different radio access technology (RAT) network in response to determining that the second SIP message indicates a network failure or a global failure;

wherein the at least one processor is further configured to:
increment a counter associated with a number of SIP failures when the second SIP message is received; and bar the UE from performing NR communication for a period, in response to each increment to the counter.

2. The apparatus of claim 1, wherein the at least one processor is configured to establish the connection with the different RAT network by:
determining that a first connection with a first fallback network can be established; and
establishing the first connection with the first fallback network in response to determining that the first connection can be established.

3. The apparatus of claim 2, wherein the at least one processor is configured to establish the connection with the different RAT network by:
in response to determining that the first connection with the first fallback network cannot be established and that a second connection with a second fallback network can be established, establishing the second connection with the second fallback network.

4. The apparatus of claim 3, wherein the at least one processor is configured to establish the connection with the different RAT network by:
in response to determining that the second connection with the second fallback network cannot be established and that a third connection with a third fallback network can be established, establishing the third connection with the third fallback network.

5. The apparatus of claim 4, wherein:
the first fallback network, the second fallback network, and the third fallback network are different RAT networks, and
the first fallback network, the second fallback network, and the third fallback network each include one of a long term evolution (LTE) network, a Wi-Fi network, a 3G network, or a 2G network.

6. The apparatus of claim 4, wherein the at least one processor is further configured to:
in response to determining that the third connection with the third fallback network cannot be established, remaining a connection with the NR base station to thereby provide IP services other than the MT IMS voice session.

7. The apparatus of claim 4, wherein the first fallback network is an LTE network, the second fallback network is a Wi-Fi network, and the third fallback network is a 3G network or a 2G network.

8. The apparatus of claim 1, wherein the at least one processor is further configured to:

bar the UE from performing NR communication for a first period when the number of SIP failures reaches a first number;

bar the UE from performing NR communication for a second period when the number of SIP failures reaches a second number, the second number being greater than the first number, and the second period being longer than the first period; and bar the UE from performing NR communication for a third period when the number of SIP failures reaches a third number, the third number being greater than the second number, and the third period being longer than the second period.

9. The apparatus of claim 8, wherein a respective length of each of the first period, the second period, and the third period is set by a telescoping timer.

10. The apparatus of claim 8, wherein the at least one processor is configured to bar the UE from NR communication by:
barring the UE from NR communication with the NR base station.

11. The apparatus of claim 8, wherein the at least one processor is configured to bar the UE from NR communication by:
barring the UE from NR communication with all NR cells in a tracking area associated with the NR base station.

12. The apparatus of claim 8, wherein the at least one processor is configured to bar the UE from NR communication by:
disabling an NR RAT at the UE.

13. A method of wireless communication of a user equipment (UE), comprising:
receiving, from a new radio (NR) base station, a paging signal associated with a mobile terminating (MT) internet protocol (IP) multimedia subsystem (IMS) voice session;

sending, to the NR base station, a first session initiation protocol (SIP) message in response to the paging signal;

receiving, from the NR base station, a second SIP message indicating SIP failure;

determining that the second SIP message indicates a network failure or a global failure; and establishing a connection with a different radio access technology (RAT) network in response to determining that the second SIP message indicates a network failure or a global failure;

wherein the method further comprises:
incrementing a counter associated with a number of SIP failures when the second SIP message is received; and barring the UE from performing NR communication for a period, in response to each increment to the counter.

14. The method of claim 13, wherein the establishing the connection with the different RAT network comprises:
determining that a first connection with a first fallback network can be established; and
establishing the first connection with the first fallback network in response to determining that the first connection can be established.

15. The method of claim 14, wherein the establishing the connection with the different RAT network further comprises:
in response to determining that the first connection with the first fallback network cannot be established and that a second connection with a second fallback network can be established, establishing the second connection with the second fallback network.

16. The method of claim 15, wherein the establishing the connection with the different RAT network further comprises:
in response to determining that the second connection with the second fallback network cannot be established and that a third connection with a third fallback network can be established, establishing the third connection with the third fallback network.

17. The method of claim 13, wherein the barring the UE from performing NR communication for a period in response to each increment to the counter comprises:
barring the UE from performing NR communication for a first period in response to the number of SIP failures reaches a first number;
barring the UE from performing NR communication for a second period in response to the number of SIP failures reaches a second number, the second number being greater than the first number, and the second period being longer than the first period; and
barring the UE from performing NR communication for a third period in response to the number of SIP failures reaches a third number, the third number being greater than the second number, and the third period being longer than the second period.

18. The method of claim 17, wherein the barring the UE from performing NR communication for any of the first period, the second period, or the third period comprises:
barring the UE from performing NR communication with the NR base station, barring the UE from performing NR communication with all NR cells in a tracking area associated with the NR base station, or disabling an NR RAT at the UE.

19. A non-transitory computer-readable medium encoding instructions that, when executed by at least one processor, perform a process for voice communication of a user equipment (UE), the process comprising:
receiving, from a new radio (NR) base station, a paging signal associated with a mobile terminating (MT) internet protocol (IP) multimedia subsystem (IMS) voice session;
sending, to the NR base station, a first session initiation protocol (SIP) message in response to the paging signal;
receiving, from the NR base station, a SIP failure message in response to the SIP message; and
establishing a connection with a different radio access technology (RAT) network in response to determining that the SIP failure message is associated with a network failure or a global failure;
wherein the process further comprises:
incrementing a counter associated with a number of SIP failures when the second SIP message is received; and
barring the UE from performing NR communication for a period, in response to each increment to the counter.

20. The non-transitory computer-readable medium of claim 19, wherein the barring the UE from performing NR communication for a period in response to each increment to the counter comprises:
barring the UE from performing NR communication for a first period in response to the number of SIP failures reaches a first number;
barring the UE from performing NR communication for a second period in response to the number of SIP failures reaches a second number, the second number being greater than the first number, and the second period being longer than the first period; and
barring the UE from performing NR communication for a third period in response to the number of SIP failures reaches a third number, the third number being greater than the second number, and the third period being longer than the second period.

* * * * *